United States Patent

[11] 3,622,239

[72] Inventor Harmon B. Miller
 1095 West Conway Drive N.W., Atalnta, Ga. 30327
[21] Appl. No. 853,009
[22] Filed Aug. 26, 1969
[45] Patented Nov. 23, 1971

[54] PHOTOGRAPHIC COPYING DEVICE
6 Claims, 6 Drawing Figs.
[52] U.S. Cl. .................................................... 355/39
[51] Int. Cl. .................................................... G03b 27/62
[50] Field of Search ........................................... 355/39

[56] References Cited
UNITED STATES PATENTS
1,787,198 12/1930 Howell ......................... 355/39
1,933,817 11/1933 Miller et al. .................. 355/39
2,615,366 10/1952 Rothweiler ................... 355/39

Primary Examiner—Samuel S. Matthews
Assistant Examiner—E. M. Bero
Attorney—Cushman, Darby & Cushman ABSTRACT: A collapsible copy attachment for use with a camera for supporting a photograph to be duplicated in front of the camera lens, the attachment consists of a camera bracket having a supplemental lens carried thereon so that when the camera bracket is attached to the camera the supplemental lens will be positioned in front of the lens of the camera to reduce the effective focal length of the camera lens; a pair of side rail members are pivotally attached at one end to the lower edge of the camera bracket and extend in spaced apart parallel relation to each other; at the other ends of the side rail members a photograph support frame is pivotally attached adjacent its lower side edges; releasable engaging means are provided both for maintaining the camera bracket and photograph support frame in position for use wherein they extend generally perpendicular to the side rail members and for maintaining them in their folded position wherein they lie between the rail members.

PATENTED NOV 23 1971

INVENTOR
HARMON B. MILLER

BY
Cushman, Darby & Cushman
ATTORNEYS

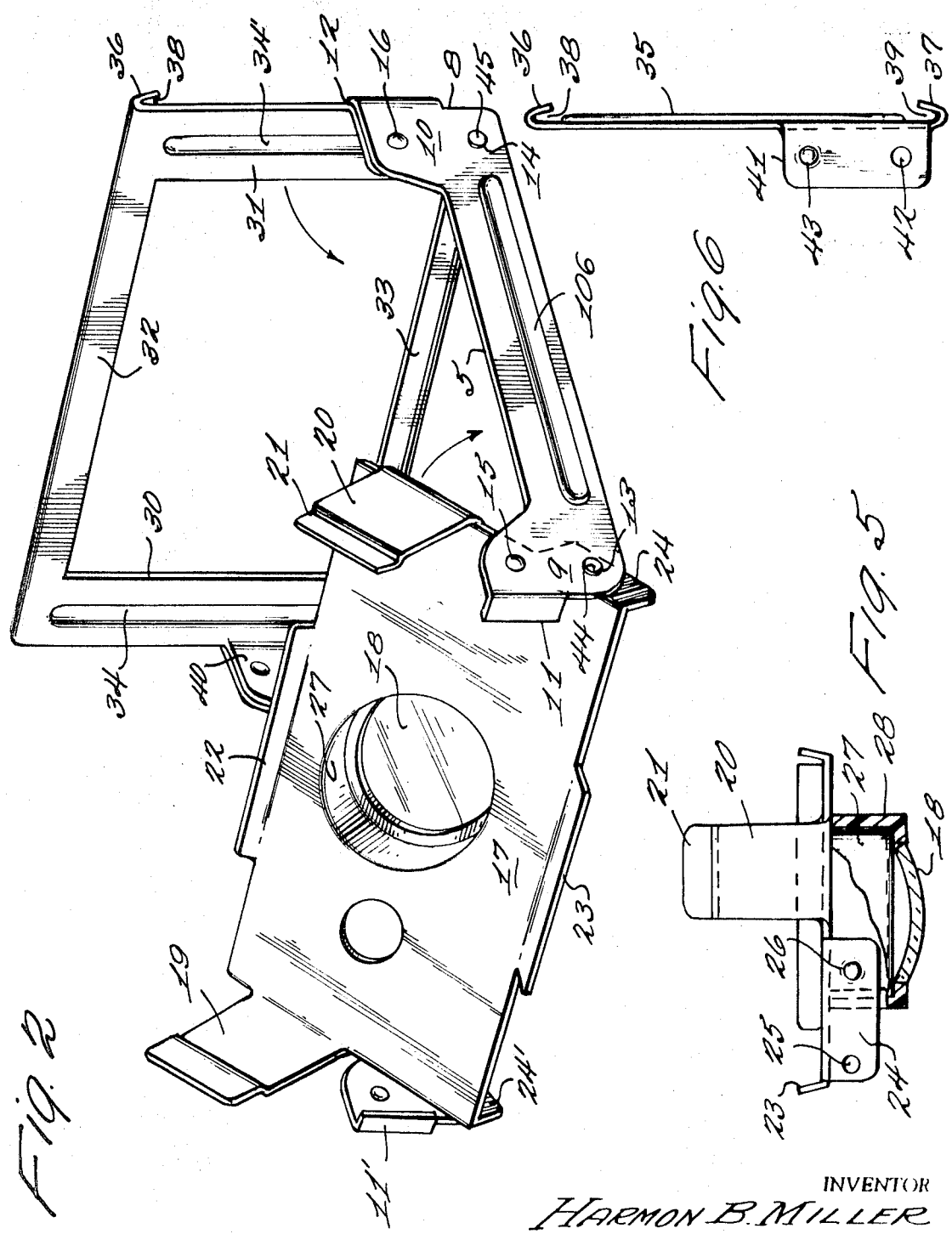

PHOTOGRAPHIC COPYING DEVICE

The present invention relates to a copy attachment for use with a camera to permit reproducing photographs and more particularly to a device comprising a supplemental support and a support for the photograph being copied at a predetermined distance from the lens. The attachment is collapsible so as to fit into a small space in a camera carrying case and is particularly intended for Land cameras which produce photographs rapidly after film exposure by diffusion of an image through a gel from a negative to a sheet of paper.

In prior U.S. Pat. application Ser. No. 812,468 filed Apr. 1, 1969, I have described paper and cardboard frames for mounting photographs. One of the principal uses of those frames is as personalized picture postcards which exhibit the mounted photograph in lieu of the photograph normally displayed on such cards. In order to utilize that device, it is necessary to provide the photographs to be mounted, and, in many cases, it will be desirable to provide duplicates of a photograph so that several postcards may be mailed and, if desired, the original preserved.

In the case of photographs made by a conventional photographic process, there usually is a negative from which numerous copies can be made. On the other hand, when photographs are made by the Land process, the negative ordinarily is not reusable and other means must be provided to produce duplicates. The most convenient way to make duplicates would be to use the Land camera itself, since duplicates can be provided in a few minutes and the picture postcards assembled and mailed by, e.g. tourists. Numerous devices have been available for producing copies of photographs with a Land camera. Essentially all that is required is means for supporting the original photograph at a predetermined distance in front of the lens, a supplemental lens to permit focusing the predetermined distance, and perhaps means to illuminate the original photograph. If the support means is suitably constructed, ambient light may be used and separate illumination means may be omitted. However, the support must be constructed so that adequate shadowless light can reach the original.

The present invention provides an improved support for the original which permits copying with ambient light and which has the further advantage of being collapsible for compact storage, e.g. in the case in which the camera and supplies are carried. The device will be described in connection with a preferred embodiment, reference being made to the drawing in which:

FIG. 2 is a perspective view of the copy attachment; and

Figure 1:
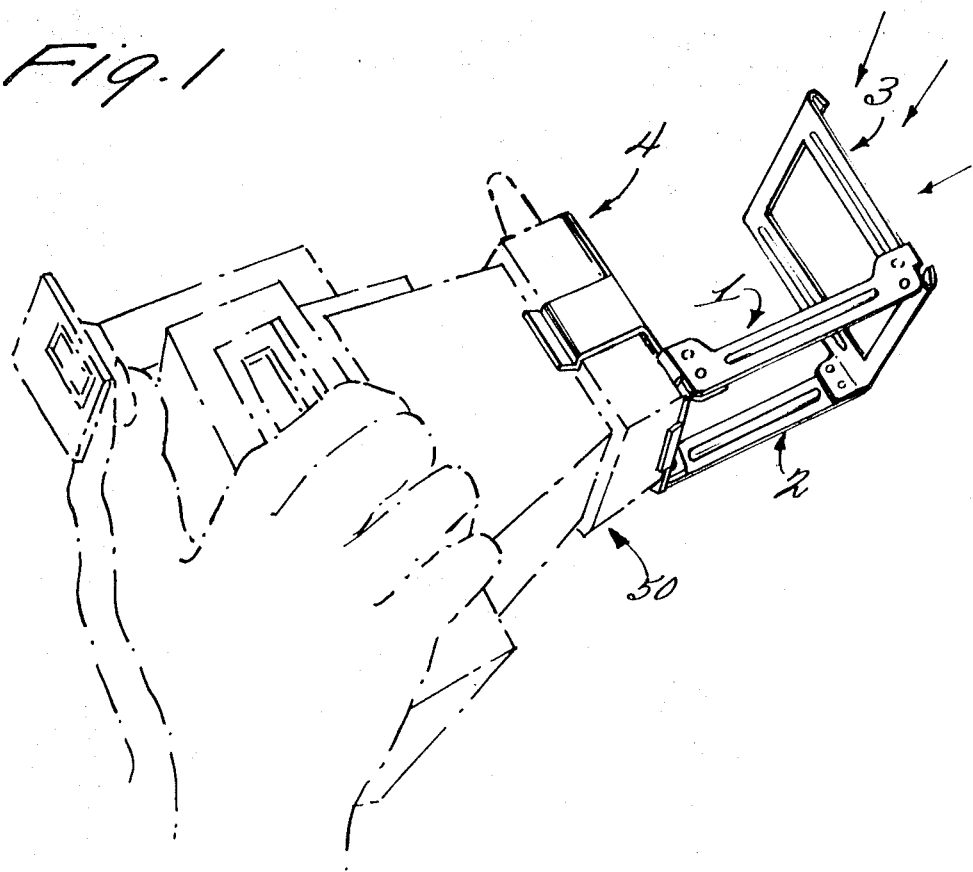
FIG. 1 is a perspective view showing the device in use.

FIGS. 3–6 show the components of the attachment. As seen in FIG. 1, the device comprises a pair of side rails 1 and 2, a support member 3 and a camera bracket indicated generally at 4. The support member and bracket are pivotally mounted at the ends of the rails to lie between the rails when the device is stored and to stand perpendicular to the rails when in use.

Figure 3:
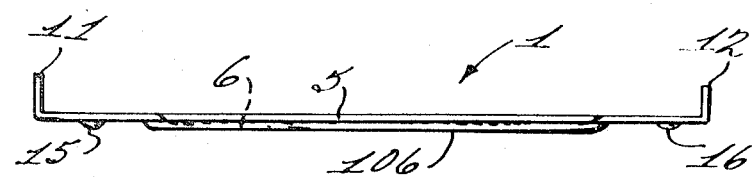
Figure 4:
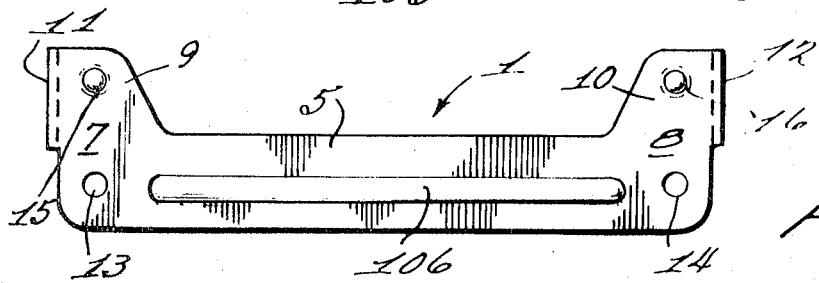

A plan view of one of the identical rails is shown in FIG. 3 and an end elevation is shown in FIG. 4. Each rail is made of sheet metal, e.g. about one thirty-second inch thick and along most of its length about one-half inch wide. Along the center portion 5 of each rail an elongated inwardly facing groove is stamped, of curved cross section and producing an elongated rib 106 extending outwardly from each rail. Near the proximal and distal ends 7 and 8 the top of the rail tapers upwardly until it forms brackets 9 and 10 which are about twice as wide as the center portion 5. There are tabs 11 and 12, each about equal in width to the center portion 5 at right angles to the rail extending inwardly from the top half of each bracket and at the ends of the rail, to form abutments against which the camera bracket and support member pivot during use. The tabs are omitted from the lower half of the brackets so as not to interfere with folding the device to its storage configuration. Two holes 13 and 14 are drilled through the lower portions of the brackets 9 and 10 respectively for pivotal connections as hereinafter described. In the upper portions of the brackets, concave sockets 15 and 16 are stamped into the inner surfaces to receive beads on the support member and the camera bracket for locking them into operative position.

The camera bracket 4 is a flat plate 17 which supports a supplementary lens 18 in front of the camera's lens and which clamps onto the front of the camera. In the embodiment illustrated, there are flat ears 19 and 20 extending rearwardly from the upper portions of the side edges of the plate 17 which snap against the sides of the front plate of the camera. Each ear is integral with plate 17 and may be made by stamping from sheet stock and bending rearwardly. Each ear preferably is bent to form an inwardly projecting latching hook 21 which snaps behind the camera's front plate. Also extending rearwardly, from the top and bottom edges of the front plate and integral therewith, are flanges 22 and 23, inclined respectively upwardly and downwardly in the embodiment shown to engage against correspondingly inclined top and bottom edges of the camera's front plate.

At the lower side edges of the plate 17 are integral, forwardly extending flanges 24 and 24' which are of approximately the same size and shape as the bracket 9 so as to be substantially concealed when the camera bracket 4 is in its upright position. Each flange has a hole 25 drilled through it in alignment with the hole 13 in bracket 9 for the pivotal connection. Also stamped in flanges 24 and 24' are outwardly convex beads, one of which is shown at 26, which is in alignment with socket 15 when the camera bracket 4 is in its upright position.

The center of bracket 4 is formed into a forwardly projecting open ended tube 27 which holds a supplemental lens 18 which may be, e.g. mounted at the end of a tube 28 whose inner wall is friction fitted against the outer wall of tube 27. The supplemental lens reduces the effective focal length of the camera lens and increases its magnification so that the distance from the lens to the film in the camera is about twice the focal length. The picture to be copied is positioned a distance about twice the focal length in front of the lens combination. With these relationships, the copy will be the same size as the original.

The support member 3 is also made by stamping and bending sheet metal, e.g. about one thirty-second inch thick. It comprises a rectangular frame including side members 30 and 31, a top 32 and a bottom 33. Grooves 34 and 34' are stamped in and along the fronts of side members 30 and 31, producing ribs 35 (see FIG. 6) extending along the backs of the side members. The distance between the ribs 35 is approximately the length of a photograph for which the device is adapted, so that the ribs serve as alignment guides for a photograph held against the rear of the frame. The upper portion of top 32 and the lower portion of the bottom 33 are bent about an angle of 180° and at a one thirty-second-inch radius to form ribs 36 and 37 which define between themselves and the frame channels 38 and 39. The distance between the channels is almost equal to the width of the photograph for which the device is adapted. These dimensions are selected for use with currently available Land color photographic materials, which are mounted on paperboard backing supplied with the film. The mounted photographs are about 0.030 inch thick, including the thickness of the mount, so that the channels 38 and 39 are almost twice as wide as the thickness of the photograph. For easier insertion and removal of photographs, the flanges 36 and 37 are inclined outwardly from the frame at an angle of 5°.

There are flanges 40 and 41 extending from the lower portions of side members 30 and 31 toward the camera. These are the same size and shape as the flanges 24 and 24' and approximately the same size and shape as bracket 10. Each has a hole 42 through its bottom portion which aligns with the hole 14 of bracket 10. There is also a bead 43 on each flange, projecting outwardly and aligning with the concave socket 46.

The three parts of the copy attachment are assembled as shown in FIGS. 1 and 2 by means of pivot shafts 44 and 45 through the holes 13 and 25 and 14 and 42 respectively. These may be machine screws held in place with nuts or loose fitting hollow rivets. In the operating position, the camera bracket 4 is erect, against tabs 11 and 11', with the beads 26 snapped into the sockets 15. The ears 19 and 20 are engaged around the front plate 50 of the camera, holding the supplemental lens in alignment with the camera's lens. The support member 3 is upright against the tabs 12, with the beads 43 snapped into sockets 16. The photograph to be copied is inserted into channels 38 and 39 and centered. The device is held up to light in such a way that the photograph is evenly illuminated; if necessary, shutter and aperture adjustments are made, and film is exposed. The film is developed and a print made in the conventional way.

One important advantage of the attachment is the ease of achieving even illumination. Since sunlight is supplied from overhead, shadows from the rails 1 and 2 are projected downwardly rather than onto the photograph being copied while the camera and attachment are in an essentially horizontal position. This in turn connects the copier more securely to the camera than if the camera had to be held at some awkward angle to achieve shadow less illumination.

Another advantage is the compact configuration when folded. The grooves 6 are slightly wider than the beads 26 and 43, the difference in width being about the thickness of the sheet metal from which the camera bracket and the support member are made. When the camera bracket 4 is folded down between the rails, the beads 26 snap into the grooves 6; then the support member 3 is folded between the rails and the beads 43 also snap into these grooves. The frame portion of support 3 rests on top of plate 17 of the camera bracket 4 so that the beads 43 are slightly higher than the beads 26, the difference being the thickness of the sheet metal of which they are made (one-half the sum of their thicknesses if the thicknesses are not the same). This assures a tight fit. In addition, the ears 19 and 20 bind against the side members 30 and 31.

The attachment shown in the drawings is shaped and dimensioned to fit the Polaroid Colorpack II camera which has been introduced recently. However, it is obvious that modifications may be made if necessary, especially in the shape and size of the camera bracket 4 for use with other Land type cameras. In this particular embodiment, the attachment has a further advantage in its size and shape when folded. That is, the size and shape is similar to that of the film pack used with the aforesaid model of Land camera. Therefore, the device is easily stored in a carrying case for the camera, that is to say in the space provided for film supply.

Other changes may be made in details of construction and mode of operation without departing from the scope of this invention.

What is claimed is:

1. A collapsible copy accessory for supporting a photograph to be duplicated within the field of view of a camera lens comprising a camera bracket including a supplemental lens, a pair of side rail members pivotally connected at one end to said camera bracket, a support for the photograph pivotally connected at the other ends of said rail members, said support being of a size at least as large as the photograph to be duplicated, the lower portions of the sides of said support having side flanges extending from them, each of said side flanges having a bead extending outwardly therefrom and spaced upwardly from the bottom of said support, said camera bracket including means for supporting said supplemental lens in front of the lens of said camera whereby the effective focal length of the lens of the camera is reduced and the distance from the lenses to the support is approximately twice the effective focal length of the lens and supplemental lens combination, said camera bracket further including a pair of side flanges extending from the lower sides of said camera bracket, each of said side flanges of said bracket having a bead extending outwardly therefrom and spaced upwardly from the bottom of said bracket, said rail members being pivotally connected at their respective ends to the side flanges respectively of said support and said camera bracket at pivot points below said beads and extending in spaced parallel relation to each other whereby said bracket and said support may be folded to lie between said rail members, and means on said side rail members for releasably engaging said support and bracket with the support and bracket perpendicular to said rail members.

2. A collapsible copy accessory as set forth in claim 1 in which said means for releasably engaging includes grooves formed in said side rail for receiving said beads when said bracket and support are folded.

3. A collapsible copy accessory as set forth in claim 1 in which said support comprises a frame having a top member, a bottom member and a pair of side members joined in the shape of a rectangle, and including means holding the photograph to be copied against the top, bottom and side members of said frame.

4. A collapsible copy accessory as set forth in claim 1 in which said means for releasably engaging comprises tabs extending laterally from said side rail members against which said support and said bracket abut when in said perpendicular positions.

5. A collapsible copy accessory as set forth in claim 1 in which said rail members have sockets, aligned with and receiving said beads when said bracket and said support are in said perpendicular positions.

6. A collapsible copy accessory for a camera to permit duplicating a photograph comprising a camera bracket, a pair of side rail members pivotally connected at one end to said camera bracket and a support pivotally connected at the other ends of said rail members, and a supplemental lens which reduces the effective focal length of the lens of the camera so that the distance from the lens to the photograph is approximately twice the effective focal length of the lens and supplemental lens combination, said support comprising a frame having a top member, a bottom member and a pair of side members joined in the shape of a rectangle, the top and bottom members being bent over away from said camera bracket to form flanges inclined outwardly from the top and bottom members, respectively, the flanges defining between themselves and said respective top and bottom members channels for receiving said photograph, the side members having ribs extending away from said camera bracket along said side members to restrain lateral movement of a photograph in said channels, the lower portions of said side members having side flanges extending from their outer edges toward said camera and said side flanges each having a bead extending outwardly therefrom and spaced upwardly from the bottom of said frame, said camera bracket comprising a bracket plate for engaging the front plate of the camera, means for holding it against said front plate, and means for supporting said supplemental lens in front of said camera lens, the lower portions of said bracket plate having a pair of side flanges extending away from said camera at the lower side edges of said bracket plate, each of said side flanges having a bead extending outwardly therefrom and spaced upwardly from the bottom of said front plate, said rail members being pivotally connected at their respective ends to the side flanges respectively of said bracket plate and said support, at pivot points below said beads, whereby said bracket plate and said frame may be folded between said rail members, said rail members having grooves therealong facing inwardly to receive said beads when the bracket plate and support are folded and said rail members having concave sockets to receive said beads when the bracket plate and support are respectively perpendicular to said rail members, and each of said rail members having tabs extending from each of its ends towards the other rail member, the bracket and support members abutting thereagainst when the bracket plate and support are respectively perpendicular to said rail members.

* * * * *